(12) United States Patent
Lee et al.

(10) Patent No.: US 12,094,083 B2
(45) Date of Patent: Sep. 17, 2024

(54) HOLOGRAPHIC ABERRATION CORRECTION METHOD AND APPARATUS

(71) Applicant: SEOUL NATIONAL UNIVERSITY R&DB FOUNDATION, Seoul (KR)

(72) Inventors: Byoungho Lee, Seoul (KR); Seung-Woo Nam, Seoul (KR); Juhyun Lee, Seoul (KR); Siwoo Lee, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 17/904,771

(22) PCT Filed: Dec. 30, 2021

(86) PCT No.: PCT/KR2021/020257
§ 371 (c)(1),
(2) Date: Aug. 22, 2022

(87) PCT Pub. No.: WO2023/128011
PCT Pub. Date: Jul. 6, 2023

(65) Prior Publication Data
US 2024/0193733 A1    Jun. 13, 2024

(30) Foreign Application Priority Data
Dec. 27, 2021 (KR) .................. 10-2021-0188867

(51) Int. Cl.
*G06T 5/10*     (2006.01)
*G03H 1/26*     (2006.01)
*G06T 11/00*    (2006.01)

(52) U.S. Cl.
CPC ............ *G06T 5/10* (2013.01); *G03H 1/2645* (2013.01); *G06T 11/00* (2013.01);
(Continued)

(58) Field of Classification Search
None
See application file for complete search history.

(56) References Cited

U.S. PATENT DOCUMENTS

| | | |
|---|---|---|
| 10,304,170 B2 | 5/2019 | Choi et al. |
| 11,314,071 B2 | 4/2022 | Kim et al. |
| 2008/0198431 A1* | 8/2008 | Schwerdtner ........ G03H 1/2294 359/32 |

(Continued)

FOREIGN PATENT DOCUMENTS

| | | |
|---|---|---|
| KR | 2018-0113690 A | 10/2018 |
| KR | 10-2036640 B1 | 10/2019 |

(Continued)

OTHER PUBLICATIONS

Amaury Badon et al., Distortion matrix concept for deep optical imaging in scattering media, Science Advances 6(30), pp. 1-11, Jul. 22, 2020.

(Continued)

*Primary Examiner* — Kee M Tung
*Assistant Examiner* — Jed-Justin Imperial
(74) *Attorney, Agent, or Firm* — Kilpatrick Townsend & Stockton LLP

(57) ABSTRACT

A holographic aberration correction method and apparatus are provided. The holographic aberration correction apparatus includes: generating a plurality of sub-holograms in a hologram, as a matrix; calculating a plurality of eigenmodes and an eigenvalue and a weight corresponding to each of the eigenmodes by performing singular value decomposition on the matrix; selecting a predefined number of eigenmodes in the order of largest eigenvalues; calculating a plurality of first results which are obtained by multiplying a plurality of identical images by respective weights corresponding to the plurality of selected eigenmodes; calculating a plurality of second results by performing convolution of the plurality of first results and the plurality of selected eigenmodes, respec- (Continued)

tively; and generating an aberration-corrected hologram by adding the plurality of second results.

9 Claims, 9 Drawing Sheets

(52) U.S. Cl.
CPC .............. *G03H 2226/02* (2013.01); *G06T 2207/20056* (2013.01); *G06T 2210/52* (2013.01)

(56) References Cited

U.S. PATENT DOCUMENTS

2010/0149311 A1* 6/2010 Kroll .................... G03H 1/0443
348/E13.001

2018/0341864 A1* 11/2018 Evnine .................. G06N 20/00
2020/0264441 A1 8/2020 Lee et al.
2020/0379406 A1* 12/2020 Kim ..................... G02B 21/367

FOREIGN PATENT DOCUMENTS

| KR | 20200101044 A | 8/2020 |
|---|---|---|
| KR | 10-2235646 B1 | 4/2021 |
| WO | 2019/117453 A1 | 6/2019 |
| WO | 2021/085889 A1 | 5/2021 |

OTHER PUBLICATIONS

International Search Report for PCT/KR2021/020257 mailed Sep. 15, 2022, all pages.

\* cited by examiner

HOLOGRAPHIC ABERRATION CORRECTION METHOD AND APPARATUS

TECHNICAL FIELD

Embodiments of the present disclosure relate to a method and apparatus for correcting aberration, and more particularly, to a method and apparatus for correcting optical aberration of a holographic display.

BACKGROUND ART

A holographic display modulates a complex wavefront of a light wave by using laser, which is a coherent light source, and a spatial light modulator (SLM). Such light wave modulation makes it is possible to imitate light waves from real objects, and is thus regarded as one of the next-generation display technologies. In order to realize a three-dimensional image by using a holographic display, it is necessary to calculate a computer-generated hologram to appropriately modulate a wavefront of a light wave. The computer-generated hologram is frequently calculated using the Rayleigh-Sommerfield diffraction integral equation and the formula for light wave propagation derived therefrom. Various methods of calculating light waves are available, and the simplest form is a method using convolution. In computer-generated holograms, a hologram that forms a single point in a space is called a sub-hologram, and by perform convolution of this sub-hologram and an image, a hologram that reproduces an image at a specific location in a space may be obtained. In free space where there is no optical system, a sub-hologram has a wavefront similar to a lens, and thus, by performing convolution of a wavefront of a lens and an image, a computer-generated hologram corresponding to the sub-hologram may be calculated.

In free space, a hologram may be generated in the manner described above, but when optical elements are positioned after the spatial light modulator, optical aberration inevitably occurs, distorting an image. In a general imaging/display system, several optical elements are arranged or specially designed lenses are used to compensate for optical aberration. However, this requires a high cost due to the complex system design and fabrication. A holographic display has a degree of freedom of wavefront modulation, and thus, aberration may be corrected, without an additional optical element, by considering an optical aberration when calculating a computer-generated hologram. Here, the most frequently used method is aberration correction using sub-hologram modulation. As described above, a sub-hologram in free space generally has a wavefront similar to that of a lens, but when there is optical aberration, the wavefront of the sub-hologram for forming a single point changes at the point. When there is optical aberration, a sub-hologram for forming a sharp point is obtained by adjusting a wavefront by a person directly or by using a result obtained by calculating using an optical simulation. By calculating a sub-hologram compensating for optical aberration of a system as above, like in the case in free space, a hologram compensating for the aberration may be calculated by performing convolution of the sub-hologram and an image. Computation time of a convolution may be reduced by using a fast Fourier transform.

However, the calculation of a hologram by using a convolution can be used only when a sub-hologram is shift-invariant, and cannot be applied when a sub-hologram is shift-variant. Because optical aberration is shift-variant in many cases, a sub-hologram for correcting the same is also shift-variant in many cases. Therefore, a process of calculating a sub-hologram that changes according to positions at every position is required, and even after calculating the sub-hologram, each time a new hologram is created, a sub-hologram corresponding to each point in an image must be added one by one. This requires a number of calculations corresponding to a product of a resolution of a sub-hologram and the resolution of an image, which is not a method using a convolution, and thus, a fast Fourier transform cannot be used, and accordingly, the calculation rate is very low.

DESCRIPTION OF EMBODIMENTS

Technical Problem

Embodiments of the present disclosure provide a method and apparatus for quickly correcting holographic aberration by using an eigenmode obtained by singular value decomposition of a sub-hologram matrix.

Solution to Problem

An example of a holographic aberration correction method according to an embodiment of the present disclosure includes: generating a plurality of sub-holograms in a hologram, as a matrix; calculating a plurality of eigenmodes and an eigenvalue and a weight corresponding to each of the eigenmodes by performing singular value decomposition on the matrix; selecting a predefined number of eigenmodes in the order of largest eigenvalues; calculating a plurality of first results which are obtained by multiplying a plurality of identical images by respective weights corresponding to the plurality of selected eigenmodes; calculating a plurality of second results by performing convolution of the plurality of first results and the plurality of selected eigenmodes; and generating an aberration-corrected hologram by adding the plurality of second results.

An example of a holographic aberration correction apparatus according to an embodiment of the present disclosure includes: a matrix generator configured to generate a plurality of sub-holograms in a hologram, as a matrix; a singular value decomposition unit configured to calculate a plurality of eigenmodes and an eigenvalue and a weight corresponding to each of the eigenmodes by performing singular value decomposition on the matrix; an eigenmode selector configured to select a predefined number of eigenmodes in the order of largest eigenvalues; a calculator configured to calculate a plurality of first results which are obtained by multiplying a plurality of identical images by respective weights corresponding to the plurality of selected eigenmodes, and calculate a plurality of second results by performing convolution of the plurality of first results and the plurality of selected eigenmodes, respectively; and a corrector configured to generate an aberration-corrected hologram by adding the plurality of second results.

Advantageous Effects of Disclosure

According to an embodiment of the present disclosure, by using an eigenmode constituting a sub-hologram of a computer-generated hologram (CGH), correction of holographic aberration may be performed at a high rate. That is, a computer-generated hologram may be calculated at a high rate, from a shift-variant sub-hologram that is calculated through simulation or an experiment. Since a convolution used in a calculation process of aberration correction may be speeded up by using a fast Fourier transform (FFT) and respective operations for eigenmodes may be parallelized, the aberration correction may be speeded up by using a parallel calculating device such as a graphics processing unit (GPU). According to the present embodiment, a sharp image may be reproduced in a complex optical system, or conversely, a display without an additional optical system for aberration compensation may be manufactured. Furthermore, holograms for correcting optical aberrations present in the human eye may also be calculated at a high rate. The present embodiment relates to an algorithm for generating a computer-generated hologram, and thus, is not restricted by a system and is applicable to holographic displays according to the related art.

MODE OF DISCLOSURE

Hereinafter, a method and apparatus for correcting holographic aberration, according to an embodiment of the present disclosure, will be described in detail with reference to the attached drawings.

Figure 1:
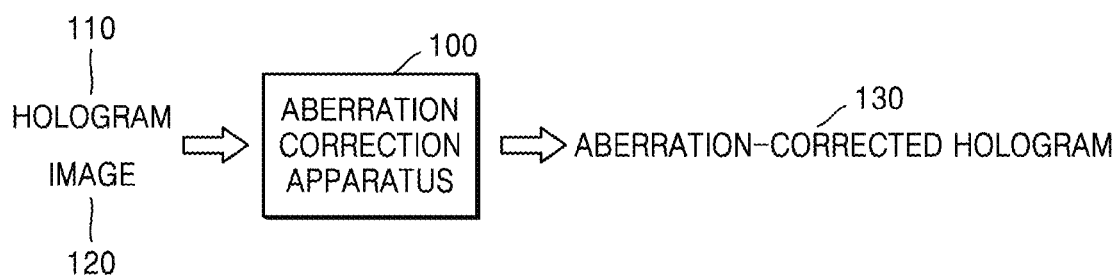
FIG. 1 illustrates an example of a holographic aberration correction apparatus according to an embodiment of the present disclosure.

FIG. 1 illustrates an example of a holographic aberration correction apparatus according to an embodiment of the present disclosure.

Referring to FIG. 1, upon receiving an image 120 and a hologram 110 of the image 120, an aberration correction apparatus 100 calculates an aberration-corrected hologram 130 obtained by correcting aberration of the hologram 110 and outputs the aberration-corrected hologram 130. The hologram 110 may be generated using various methods according to the related art, and may be, for example, a computer-generated hologram. In the present embodiment, the hologram 110 is assumed to be generated in advance using various methods. According to embodiments, the image 120 may be a two-dimensional image or a three-dimensional image.

Figure 2:
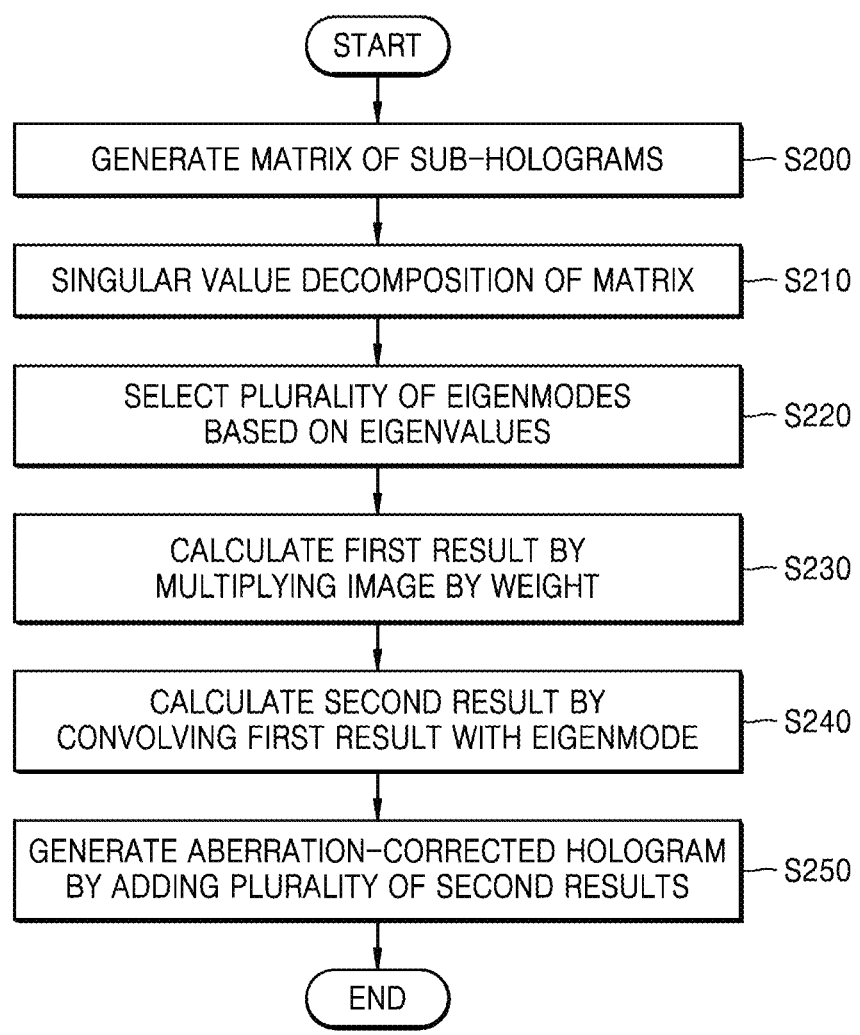
FIG. 2 is a flowchart of an embodiment of a method of correcting holographic aberration, according to an embodiment of the present disclosure.

FIG. 2 is a flowchart of an embodiment of a method of correcting holographic aberration, according to an embodiment of the present disclosure.

Figure 4:
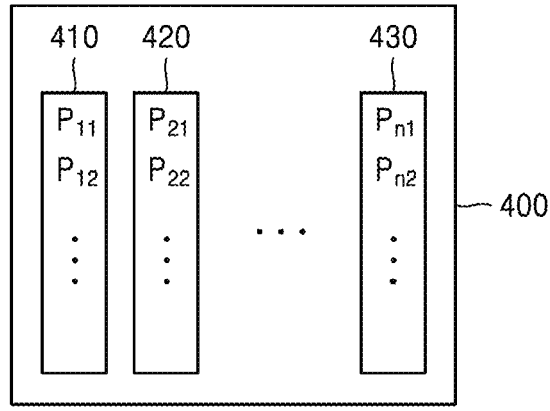
FIG. 4 illustrates an example of a method of displaying a sub-hologram, as a matrix, according to an embodiment of the present disclosure.

Referring to FIG. 2, the aberration correction apparatus 100 generates, as a matrix, a plurality of sub-holograms included in a hologram in operation S200. A sub-hologram refers to a hologram forming a point of a holographic image displayed in a space. Therefore, the number of sub-holograms included in a hologram is determined by the resolution of a holographic image. An example of a method of generating sub-holograms of a hologram as a matrix is illustrated in FIG. 4.

The aberration correction apparatus 100 performs singular value decomposition on a matrix of sub-holograms in operation S210. By performing singular value decomposition of a matrix, a plurality of eigenmodes and eigenvalues of the eigenmodes may be obtained. The singular value decomposition method of a matrix is well-known, and thus, an additional description thereof will be omitted.

The aberration correction apparatus 100 selects a plurality of eigenmodes based on eigenvalues in operation S220. For example, the aberration correction apparatus 100 may select the top N (e.g., three, etc.) eigenmodes in the order of largest eigenvalues. The number of eigenmodes may be variously set according to embodiments.

Figure 6:
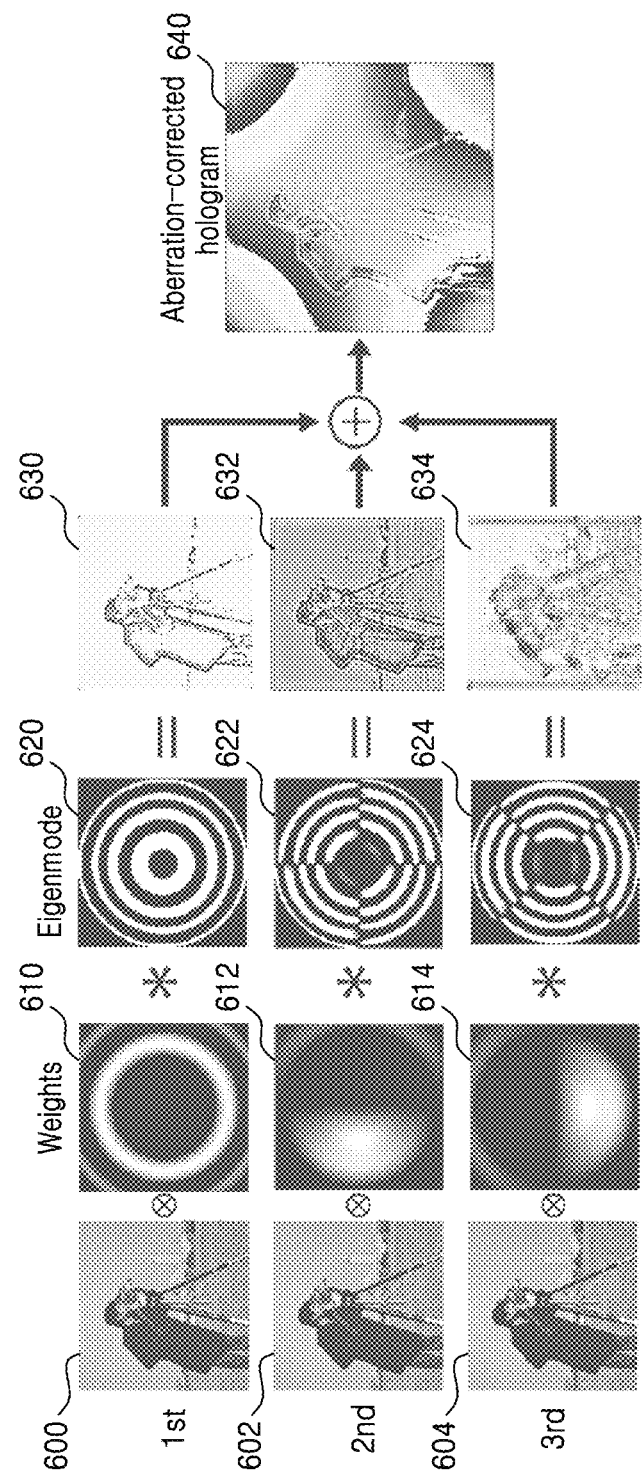
FIG. 6 illustrates an example of a process of generating an aberration-corrected hologram, according to an embodiment of the present disclosure.

The aberration correction apparatus 100 calculates a first result obtained by multiplying a plurality of identical images by respective weights of the plurality of selected eigenmodes in operation S230. According to an embodiment, the aberration correction apparatus 100 may calculate an image and a weight by a Hadamard product to obtain a first result. For example, when three eigenmodes are selected as illustrated in FIG. 6, the aberration correction apparatus 100 may copy three copies of the same image and obtain a first result by multiplying each image by a weight of each eigenmode. A value calculated by calculating a dot product of each eigenmode and a matrix may be obtained as the weight of each eigenmode.

The aberration correction apparatus 100 calculates a plurality of second results by performing convolution of the plurality of previously selected eigenmodes and the plurality of first results respectively, in operation S240. The aberration correction apparatus 100 may apply a fast Fourier transform (FFT) to the convolution.

The aberration correction apparatus 100 generates an aberration-corrected hologram by adding the plurality of second results in operation S250. For example, the aberration correction apparatus 100 may obtain an aberration-corrected hologram by adding a two-dimensional matrix representing the plurality of second results.

Figure 3:
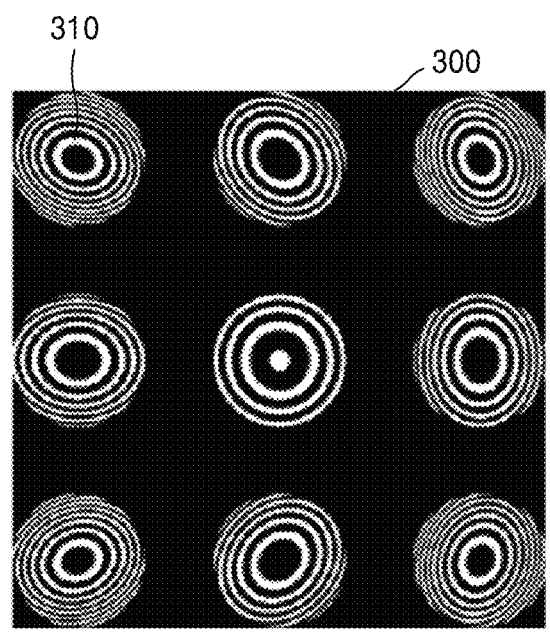
FIG. 3 illustrates an example of a sub-hologram according to an embodiment of the present disclosure.

FIG. 3 illustrates an example of a sub-hologram according to an embodiment of the present disclosure.

Referring to FIG. 3, a hologram 300 includes a plurality of sub-holograms 310. The hologram 300 may include a very large number of sub-holograms 310 according to the resolution of a holographic image displayed in a space. However, in the present embodiment, some of the sub-holograms 310 included in the hologram 300 are schematically expressed to help understanding.

FIG. 4 illustrates an example of a method of displaying a sub-hologram, as a matrix, according to an embodiment of the present disclosure.

Referring to FIGS. 3 and 4 together, the sub-hologram 310 includes a phase value of a complex plane. For example, the sub-hologram 310 may include two-dimensional pixels of an a*b size, and each pixel may include a phase value of a complex plane. The number of pixels of a two-dimensional image expressing the sub-hologram 310 may be variously set according to embodiments.

The aberration correction apparatus 100 may arrange phase values Pnm of each of the sub-holograms 310 in a row direction or a column direction. That is, values of each pixel of the two-dimensional image representing the sub-hologram 310 may be arranged in a line. In the present embodiment, it is assumed that phase values of each sub-hologram 310 are arranged in columns 410, 420, and 430 for convenience of description. The aberration correction apparatus 100 may generate a matrix 400 by arranging the columns 410, 420, and 430 including the phase values of each sub-hologram 310 side by side. For example, when the number of phase values of each sub-hologram is N and the number of sub-holograms is M, N*M matrices 400 are generated.

Figure 5:
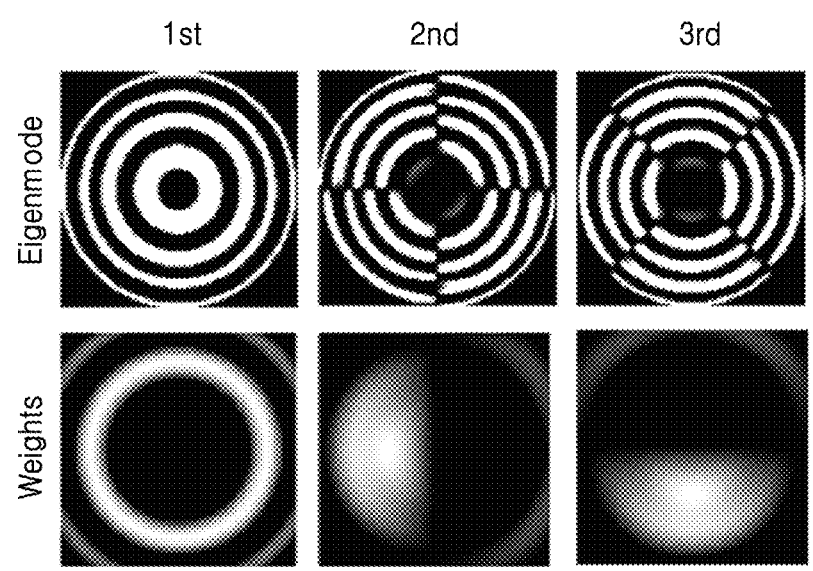
FIG. 5 illustrates an example of a result of singular value decomposition of a matrix of a sub-hologram, according to an embodiment of the present disclosure.

FIG. 5 illustrates an example of a result of singular value decomposition of a matrix of a sub-hologram, according to an embodiment of the present disclosure.

Referring to FIG. 5, the aberration correction apparatus 100 may perform singular value decomposition of the matrix 400 of FIG. 4 to obtain a plurality of eigenmodes and an eigenvalue and a weight for each eigenmode. The weight may be obtained by calculating a dot product of each eigenmode and a matrix. In addition, various methods of calculating the weight of each eigenmode, according to the related art, may be applied to the present embodiment.

The aberration correction apparatus 100 may select a certain number of eigenmodes based on the size of the eigenvalue. In the present embodiment, a case in which the top three eigenmodes having largest eigenvalues are selected is illustrated. A two-dimensional array of each selected eigenmode and each eigenvalue, expressed as an image, is as shown in FIG. 5. FIG. 5 illustrates an example of illustrating an eigenmode and a weight for any one sub-hologram 310 as an image to help understanding.

FIG. 6 illustrates an example of a process of generating an aberration-corrected hologram, according to an embodiment of the present disclosure.

Referring to FIG. 6, it is assumed that singular value decomposition is performed on a matrix of sub-holograms and top three eigenmodes (that is, first to third eigenmodes) are selected in the order of largest eigenvalues. The aberration correction apparatus 100 prepares first to third images 600, 602, and 603 for the first to third eigenmodes. The first to third images 600, 602, and 604 are the same images.

The aberration correction apparatus 100 multiplies the first to third images 600, 602, and 604 by weights 610, 612, and 614 of the first to third eigenmodes, respectively. That is, the aberration correction apparatus 100 multiplies the first image 600 by the weight 610 of the first eigenmode, the second image 602 by the weight 612 of the second eigenmode, and the third image 604 by the weight 614 of the third eigenmode. In detail, the aberration correction apparatus 100 obtains a first result by multiplying each element of a two-dimensional matrix consisting of pixel values of an image and each element of a two-dimensional matrix of weights. The aberration correction apparatus 100 may apply a Hadamard product to respective products of the images 600, 602, and 604 and the weights 610, 612, and 614.

The aberration correction apparatus 100 calculates convolutions of a plurality of first results obtained by multiplying the images 600, 602, 604 by the weights 610, 612, 614 and first to third eigenmodes 620, 622, and 624, respectively. Then, the aberration correction apparatus 100 generates an aberration-corrected hologram 640 by adding a plurality of second results 630, 632, and 634 obtained by performing convolution of the plurality of first results and the first to third eigenmodes 620, 622, and 624, respectively.

In another embodiment, the aberration correction apparatus 100 may perform in parallel the calculation of a product of the weights 610,612 and 614 of the first to third eigenmodes 620, 622, and 624 and the convolution calculation. For example, a first process of multiplying the first image 600 by the weight 610 of the first eigenmode 620 and then obtaining a convolution with the first eigenmode 620, a second process of multiplying the second image 602 by the weight 612 of the eigenmode 622 and then obtaining a convolution with the second eigenmode 622, and a third process of multiplying the third image 604 by the weight 614 of the third eigenmode 624 and then obtaining a convolution with the third eigenmode 624 may be separately performed.

Figure 7:
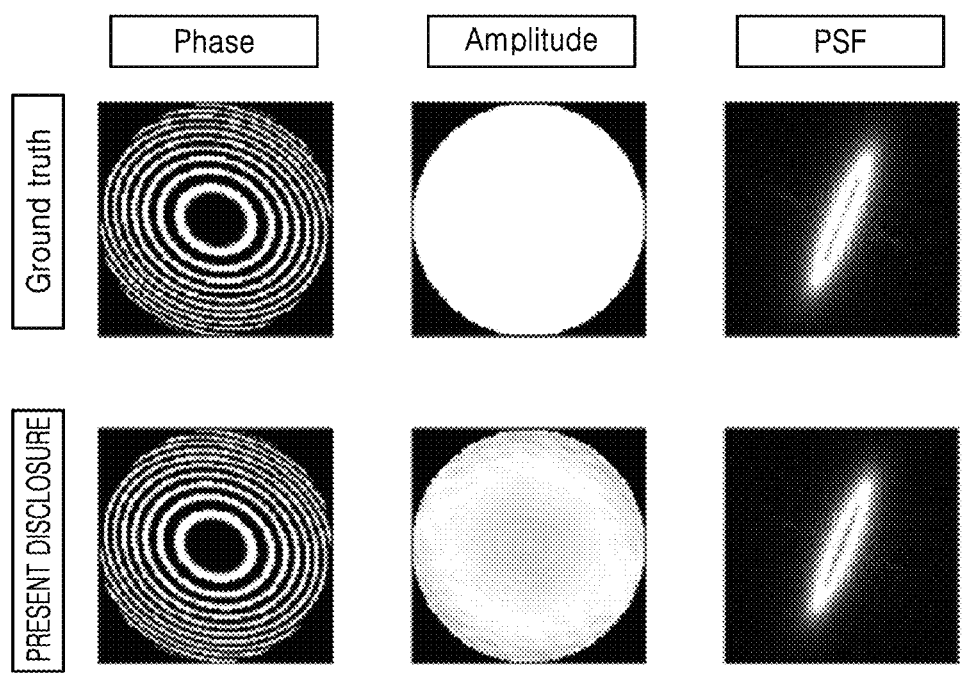
FIGS. 7 and 8 illustrate simulation results of an aberration correction method according to an embodiment of the present disclosure.
Figure 8:
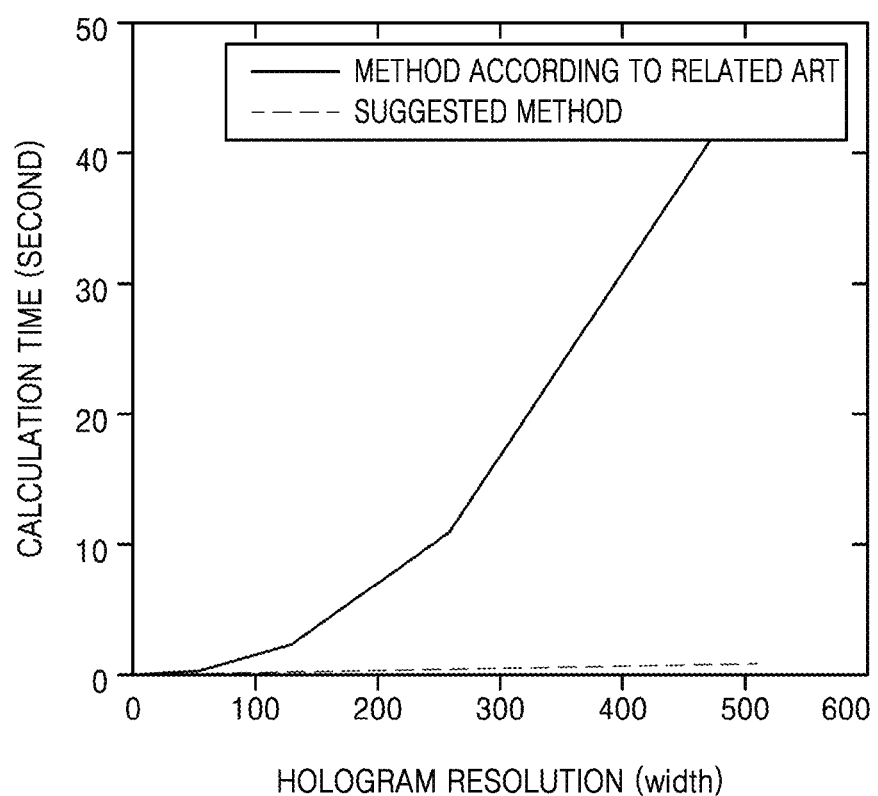

FIGS. 7 and 8 illustrate simulation results of an aberration correction method according to an embodiment of the present disclosure.

Referring to FIG. 7, a result of calculating fifty eigenmodes from a sub-hologram by using the method according to an embodiment of the present disclosure and reproducing the sub-hologram at an arbitrary position is shown. Although a phase of the sub-hologram was restored almost without error, it can be seen that there is an error in amplitude. However, as more information is delivered via a phase than amplitude in a hologram, there is no problem in forming a holographic image. In a point-spread function (PSF), which is an image formed when the sub-hologram is propagated in free space, it can be seen that there is no significant difference between the embodiment of the present disclosure and the ground truth.

Referring to FIG. 8, a graph showing a period of time required to calculate an aberration-corrected hologram by using the method according to an embodiment of the present disclosure is shown. Referring to the graph, it can be seen that the method of the embodiment of the present disclosure exhibits a significantly higher calculation speed than the method according to the related art, and the degree of increased calculation time as a resolution of a hologram increases is also less compared to the method according to the related art. This is because it is designed to be able to use a convolution when calculating an aberration-corrected hologram and thus a fast Fourier transform may be used in the method according to the embodiment of the present disclosure. Using more eigenmodes decreases the calculation speed, but instead allows reproducing an accurate sub-hologram. On the other hand, instead of increasing an error by using fewer eigenmodes, an aberration-corrected hologram may be generated at a high speed.

Figure 9:
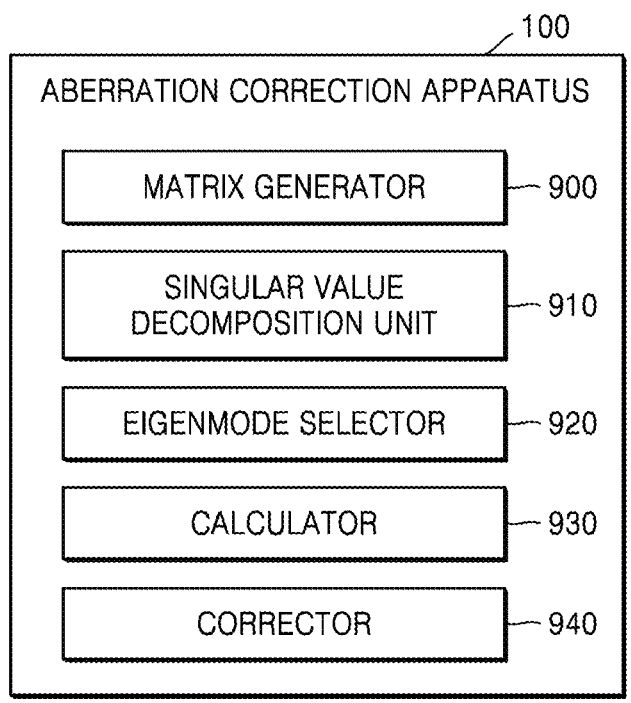
FIG. 9 illustrates a configuration of an example of a holographic aberration correction apparatus according to an embodiment of the present disclosure.

FIG. 9 illustrates a configuration of an example of a holographic aberration correction apparatus according to an embodiment of the present disclosure.

Referring to FIG. 9, the aberration correction apparatus 100 includes a matrix generator 900, a singular value decomposition unit 910, an eigenmode selector 920, a calculator 930, and a corrector 940. The aberration correction apparatus 100 may be implemented as a computing device including a memory, a processor, an input/output device, and the like. In this case, each component may be implemented in software and loaded in a memory, and then performed by a processor.

The matrix generator 900 generates a plurality of sub-holograms existing in a hologram as a matrix. The matrix generator 900 may generate a matrix by arranging, in rows or columns, phase values of each sub-hologram existing in a two-dimensional complex plane. An example of generating a matrix is illustrated in FIG. 4.

The singular value decomposition unit 910 performs singular value decomposition on the matrix of the sub-hologram to calculate a plurality of eigenmodes and an eigenvalue and a weight corresponding to each eigenmode.

The eigenmode selector 920 selects a predefined number of eigenmodes in the order of largest eigenvalues.

The calculator 930 calculates a plurality of first results obtained by multiplying a plurality of identical images by weights of a plurality of eigenmodes, and calculates a plurality of second results by performing convolution of the plurality of first results and the plurality of eigenmodes, respectively. As an example, the calculator 930 may obtain a weight of each eigenmode by calculating a dot product of each eigenmode and the matrix. As another example, the calculator 930 may calculate a first result by calculating an image and a weight by a Hadamard product.

The corrector 940 generates an aberration-corrected hologram by adding the plurality of second results.

Each embodiment of the present disclosure may also be implemented as computer-readable code on a computer-readable recording medium. The computer-readable recording medium includes all types of recording devices in which data readable by a computer system is stored. Examples of the computer-readable recording medium include ROM, RAM, a CD-ROM, an SSD, and optical data storage devices. In addition, the computer-readable recording medium is distributed in a network-connected computer system so that the computer-readable code can be stored and executed in a distributed manner.

While the present disclosure has been particularly shown and described with reference to embodiments thereof, it will be understood by those of ordinary skill in the art that various changes in form and details may be made therein without departing from the spirit and scope of the present disclosure as defined by the appended claims. The disclosed embodiments should be considered in a descriptive sense only and not for purposes of limitation. Therefore, the scope of the present disclosure is defined not by the detailed description of the present disclosure but by the appended claims, and all differences within the scope will be construed as being included in the present disclosure.

The invention claimed is:

1. A holographic aberration correction method comprising:
    generating a plurality of sub-holograms in a hologram, as a matrix;
    calculating a plurality of eigenmodes and an eigenvalue and a weight corresponding to each of the eigenmodes by performing singular value decomposition on the matrix;
    selecting a predefined number of eigenmodes in the order of largest eigenvalues;
    calculating a plurality of first results which are obtained by multiplying a plurality of identical images by respective weights corresponding to the plurality of selected eigenmodes;
    calculating a plurality of second results by performing convolution of the plurality of first results with the plurality of selected eigenmodes, respectively; and
    generating an aberration-corrected hologram by adding the plurality of second results.

2. The holographic aberration correction method of claim 1, wherein the generating of the matrix comprises generating a matrix by arranging, in rows or columns, phase values of each sub-hologram existing in a two-dimensional plane.

3. The holographic aberration correction method of claim 1, wherein the calculating of the weight comprises determining, as the weight, a value obtained by calculating a dot product of the eigenmode and the matrix.

4. The holographic aberration correction method of claim 1, wherein the calculating of the first results comprises generating the first results by calculating each image and each weight by a Hadamard product.

5. A non-transitory computer-readable recording medium having recorded thereon a program for executing the method of claim 1.

6. A holographic aberration correction apparatus comprising:
    a matrix generator configured to generate a plurality of sub-holograms in a hologram, as a matrix;
    a singular value decomposition unit configured to calculate a plurality of eigenmodes and an eigenvalue and a weight corresponding to each of the eigenmodes by performing singular value decomposition on the matrix;
    an eigenmode selector configured to select a predefined number of eigenmodes in the order of largest eigenvalues;
    a calculator configured to calculate a plurality of first results which are obtained by multiplying a plurality of identical images by respective weights corresponding to the plurality of selected eigenmodes, and calculate a plurality of second results by performing convolution of the plurality of first results and the plurality of selected eigenmodes respectively; and
    a corrector configured to generate an aberration-corrected hologram by adding the plurality of second results.

7. The holographic aberration correction apparatus of claim 6, wherein the matrix generator generates a matrix by arranging, in rows or columns, phase values of each sub-hologram existing in a two-dimensional plane.

8. The holographic aberration correction apparatus of claim 6, wherein the calculator determines, as the weight, a value obtained by calculating a dot product of the eigenmode and the matrix.

9. The holographic aberration correction apparatus of claim 6, wherein the calculator generates the first results by calculating each image and each weight by a Hadamard product.

* * * * *